(12) United States Patent
Go (10) Patent No.: US 6,467,715 B2
(45) Date of Patent: Oct. 22, 2002

(54) OVERHEAD POWER LINE INSTALLATION APPARATUS

(75) Inventor: Young-Kyu Go, Sunchun (KR)

(73) Assignee: Dong-Hae Corporation, Sunchun (KR)

( * ) Notice: Subject to any disclaimer, the term of this patent is extended or adjusted under 35 U.S.C. 154(b) by 0 days.

(21) Appl. No.: 10/005,069

(22) Filed: Dec. 7, 2001

(65) Prior Publication Data

US 2002/0038835 A1 Apr. 4, 2002

Related U.S. Application Data

(63) Continuation of application No. PCT/KR00/01046, filed on Sep. 18, 2000.

(30) Foreign Application Priority Data

Jun. 14, 2000 (KR) .............................................. 00-32806

(51) Int. Cl.[7] .......................... B65H 75/30; B65H 75/40
(52) U.S. Cl. .............. 242/390.5; 242/242; 254/134.3 R
(58) Field of Search .......................... 242/390.5, 390.6, 242/393, 397.3, 403; 254/134.3 R (56) References Cited

U.S. PATENT DOCUMENTS

| 2,679,987 | A | * | 6/1954 | Saliba ......................... 242/393 |
| 2,991,024 | A | * | 7/1961 | Goode ..................... 242/390.6 |
| 3,030,075 | A | * | 4/1962 | Kocalis ............... 254/134.3 R |
| 3,458,152 | A | * | 7/1969 | Barkley et al. ....... 254/134.3 R |
| 4,148,445 | A | * | 4/1979 | Reynolds et al. ........... 242/403 |
| 4,213,596 | A |   | 7/1980 | Inoue et al. .......... 254/134.3 R |
| 4,228,967 | A | * | 10/1980 | Woodruff .................. 242/390.5 |
| 4,343,443 | A |   | 8/1982 | Grounds |
| 4,454,999 | A | * | 6/1984 | Woodruff ..................... 242/393 |
| 4,508,281 | A | * | 4/1985 | Plater ...................... 242/390.6 |
| 4,542,861 | A | * | 9/1985 | Barnes ........................ 424/393 |
| 4,649,954 | A |   | 3/1987 | Dunwoody ............ 137/355.27 |
| 4,852,856 | A | * | 8/1989 | Correll ................ 254/134.3 R |
| 5,007,599 | A | * | 4/1991 | Forsyth ................... 242/390.6 |
| 5,215,272 | A | * | 6/1993 | Sauber .................... 242/390.5 |

FOREIGN PATENT DOCUMENTS

| JP | 50-37093 | 4/1975 |
| KR | 51-97290 | 8/1976 |
| KR | 89-1620 | 3/1989 |
| KR | 7-172693 | 7/1995 |
| KR | 95-28770 | 10/1995 |

OTHER PUBLICATIONS

International Search Report from PCT/KR00/01046 dated Mar. 21, 2001.

\* cited by examiner

*Primary Examiner*—John M. Jillions
(74) *Attorney, Agent, or Firm*—Pennie & Edmonds LLP (57) ABSTRACT

A device for installing high-voltage power lines in an overhead status for an initial installation or repair thereof is particularly suited to an overhead power line installation apparatus. The device is capable of achieving easy control for a line winding operation while allowing the line winding operation to cope appropriately with the size of a line winding drum used, and to be conducted without any twisting and tangling of the line being wound.

14 Claims, 7 Drawing Sheets

OVERHEAD POWER LINE INSTALLATION APPARATUS

RELATED APPLICATIONS

This is a Continuation under 35 U.S.C. §120 of the U.S. National Stage Designation of international application no. PCT/KR00/01046, filed Sep. 18, 2000.

FIELD OF THE INVENTION

The present invention relates to an overhead power line installation apparatus for installing high-voltage power lines in an overhead status for an initial installation or repair thereof, and more particularly to an overhead power line installation apparatus capable of achieving an easy control for a line winding operation while allowing the line winding operation to cope appropriately with the size of a line winding drum used, and to be conducted without any twisting and tangling of the line being wound.

BACKGROUND OF THE INVENTION

Conventionally, line installation or replacement tasks are conducted using a traditional method. In accordance with the traditional method, a line installation task is conducted by a number of workers who conduct desired tasks on poles or on the ground. That is, an on-ground worker connects one end of a power line to a lower end of a rope hung from a post installed on a line installation area for an initial line installation or line replacement. Thereafter, an on-post worker draws up the rope to lift up the power line, and then attaches the lifted power line to an insulator fixed to a cross arm of the post. After completion of the line installation on one post, the on-ground and on-post workers repeat the above mentioned procedures for the next post. However, such a traditional line installation or replacement method is inconvenient.

In order to solve the problem involved in the traditional method, the inventor has proposed an apparatus and method capable of easily installing and replacing overhead power lines. The proposed apparatus and method are disclosed in Korean Patent Application No. 99-18716 filed on May 24, 1999 and titled "Installation Apparatus for Overhead Power Lines and Installation Method Using the Same."

The present invention is intended to improve the proposed overhead power line installation apparatus and method in order to achieve a very effective, economical, rapid, and safe installation conducted in an overhead fashion involving no requirement for power lines to come into contact with the ground while achieving an improvement in installation quality.

SUMMARY OF THE INVENTION

Therefore, an object of the invention is to provide an overhead power line installation apparatus capable of achieving a very effective, economical, rapid, and safe installation conducted in an overhead fashion involving no requirement for power lines to come into contact with the ground while achieving an improvement in installation quality.

Another object of the invention is to provide an overhead power line installation apparatus in which winding of power lines is carried out and controlled using a hydraulic pressure generated from an engine, thereby being capable of improvements in reliability and controllability.

Another object of the invention is to provide an overhead power line installation apparatus capable of allowing an installation of a maximum of 4 power lines while completely preventing a twisting phenomenon of those power lines during a winding operation.

In accordance with the present invention, these objects are accomplished by providing an overhead power line installation apparatus for installing electric wires respectively wound around wire bobbins in the form of power lines of a 3-phase 3-wire type or power lines of a 3-phase 4-wire type on posts, comprising: a frame; an engine installed on the frame and adapted to generate a drive power; a plurality of wire bobbin driving units arranged on the frame and adapted to rotate the wire bobbins, respectively; a plurality of wire bobbin support units installed on the frame, each of the wire bobbin support units serving to support an associated one of the wire bobbins to allow a rotation and level adjustment of the associated wire bobbin; a wire twist preventing unit arranged on the frame and adapted to prevent the wires from being twisted when the wires are wound around or unwound from the wire bobbins; and a hydraulic circuit receiving the drive power from the engine, thereby generating a hydraulic pressure, the hydraulic circuit serving to control the wire bobbin driving units, the wire bobbin support units, and the wire twist preventing unit using the hydraulic pressure.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE INVENTION

Figure 1:
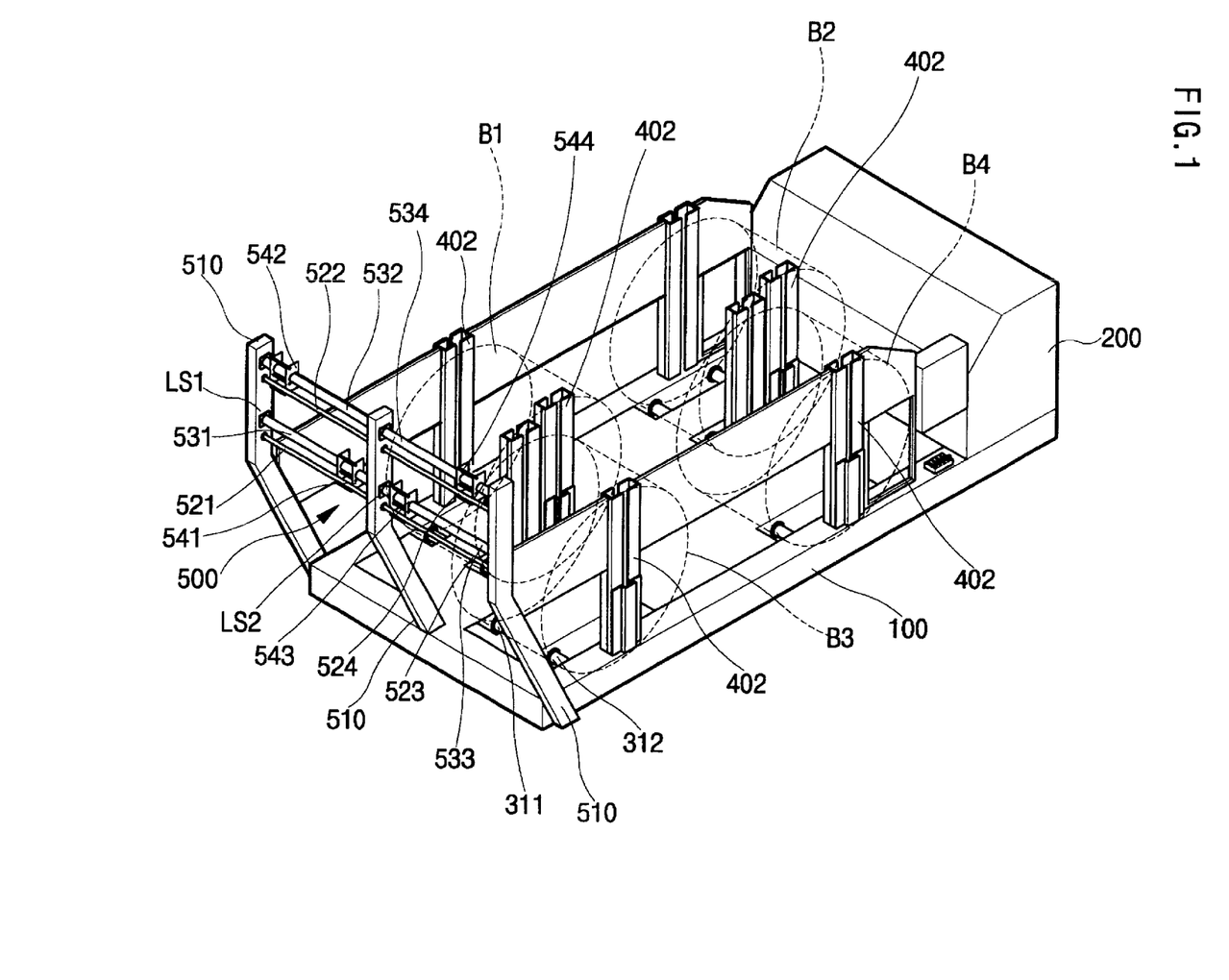
FIG. 1 is a perspective view of an overhead power line installation apparatus according to an embodiment of the present invention.
Figure 2:
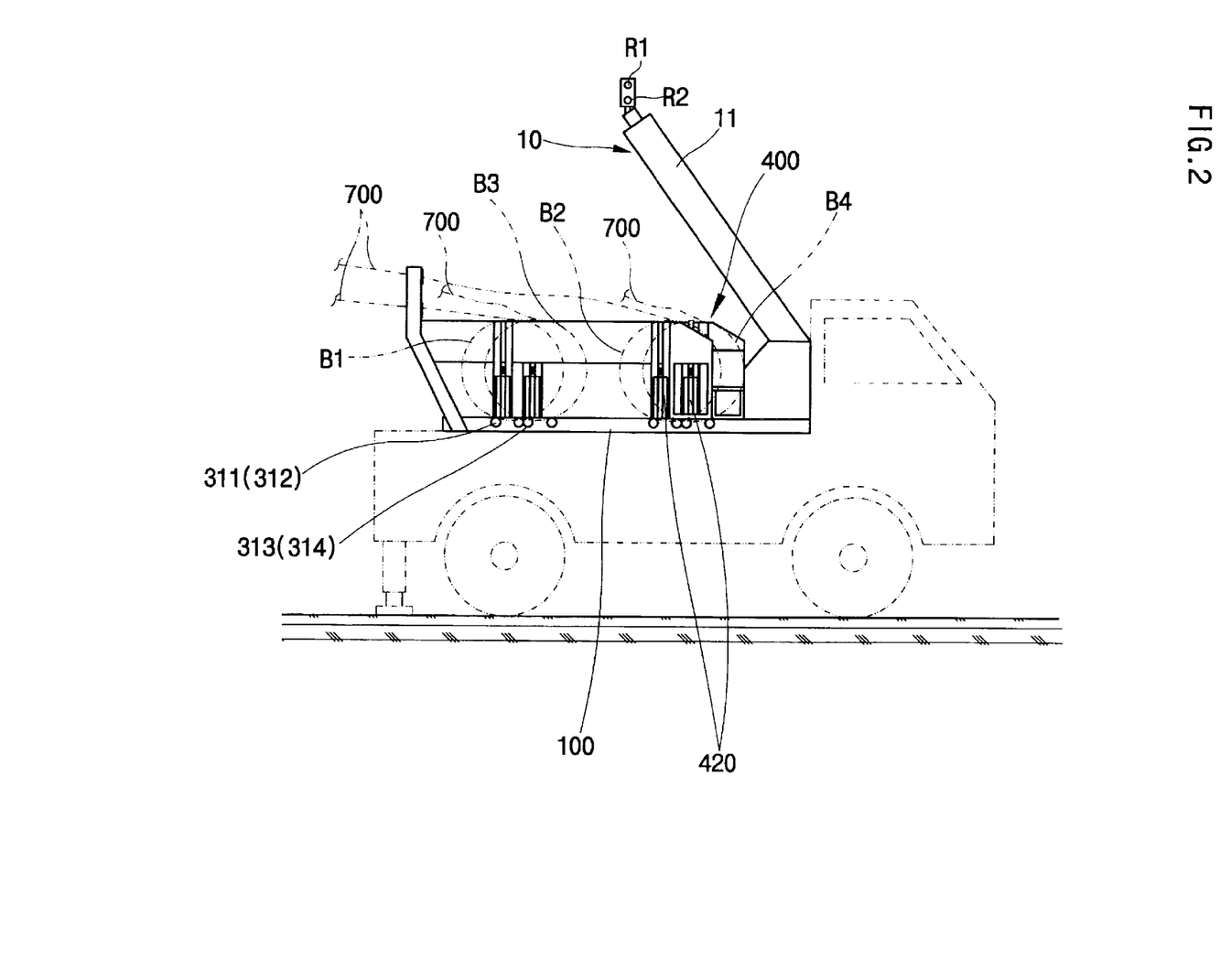
FIG. 2 is a side view illustrating the overhead power line installation apparatus installed on a vehicle.
Figure 3:
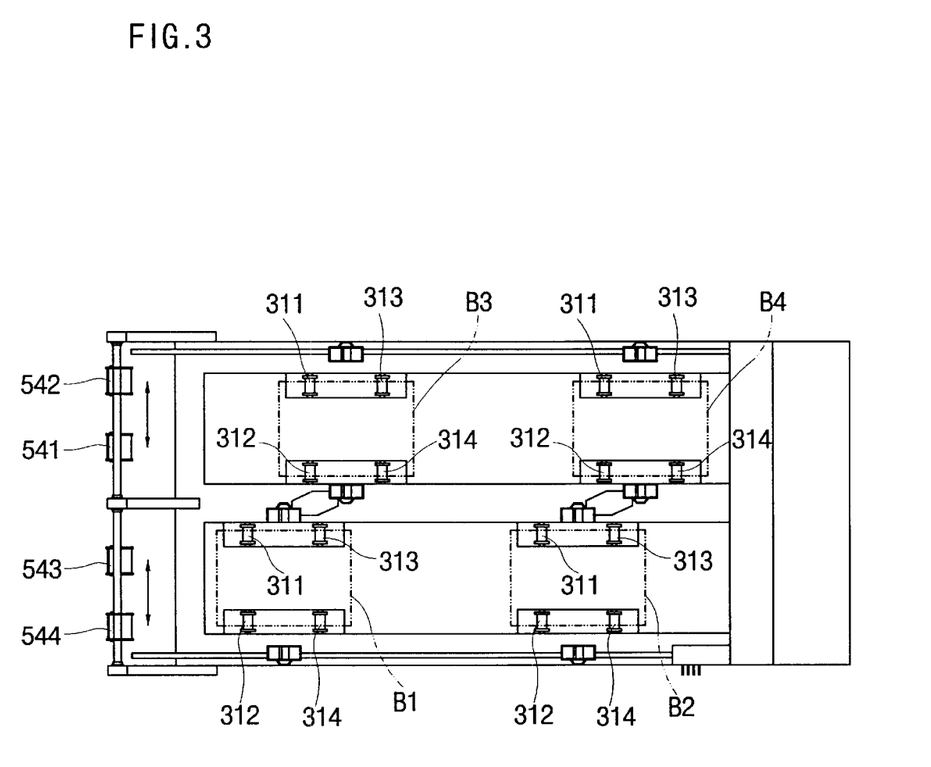
FIG. 3 is a plan view of the overhead power line installation apparatus, illustrating an arrangement of wire bobbins.

Referring to FIG. 1, the reference numeral 100 denotes a frame included in an overhead power line installation apparatus according to an embodiment of the present invention. The frame 100 supports a plurality of wire bobbins. The frame 100 has a size capable of allowing the frame 100 to be carried on a vehicle on which a crane is installed.

The overhead power line apparatus is adapted to use a maximum of 4 wire bobbins, so as to install power lines of the 3-phase 3-wire type or power lines of the 3-phase 4-wire type.

An engine assembly 200 is installed on the frame 100 at one side of the frame 100.

The engine assembly 200 includes an engine 202, a reduction gearing 204 for reducing the output from the engine 202, and a pair of hydraulic pumps 1002 and 2002 for generating a hydraulic pressure in accordance with an output from the engine 202 transmitted thereto via the reducing gearing 204, and transmitting the hydraulic pressure to a hydraulic circuit communicating therewith.

The frame 100 also carries four wire bobbin driving units 300 for driving a maximum of four wire bobbins B1, B2, B3, and B4.

Figure 4:
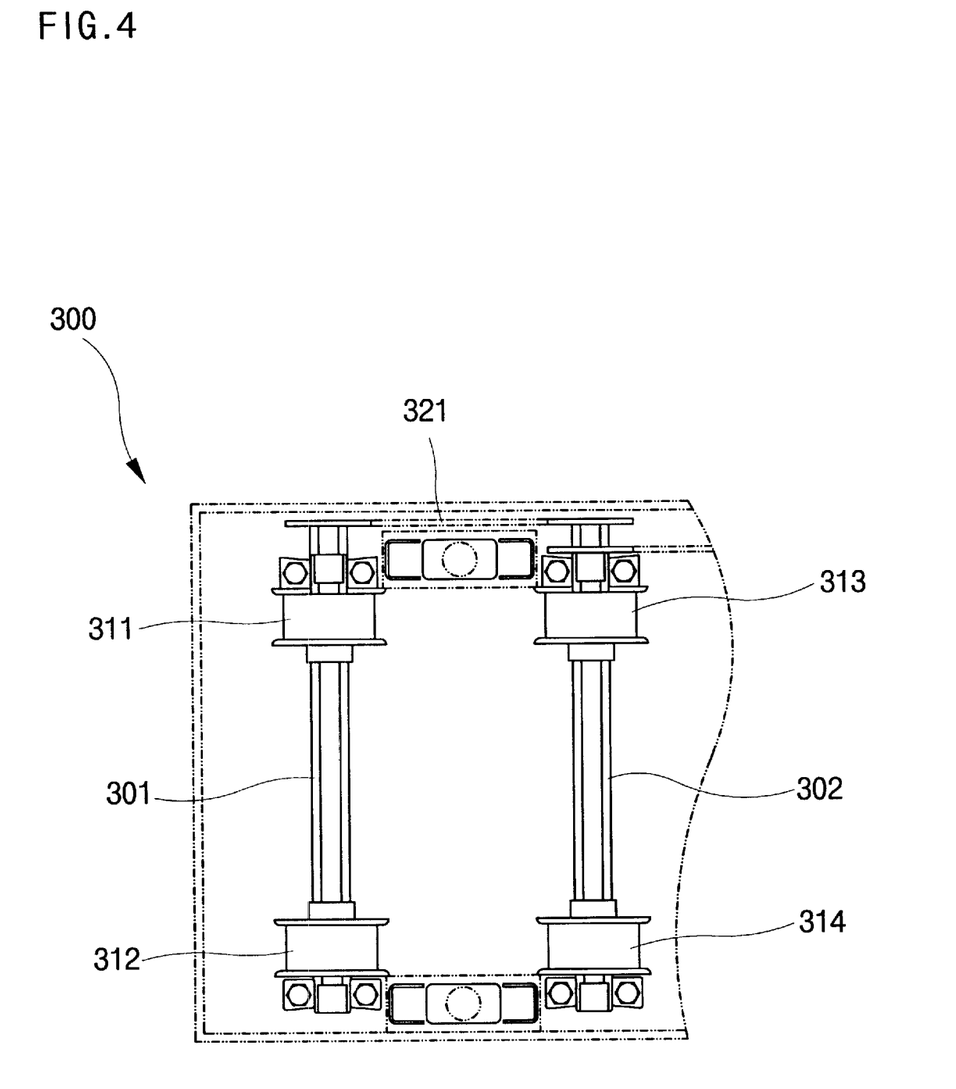
FIG. 4 is a plan view of a wire bobbin driving unit included in the overhead power line installation apparatus.

The configuration of one wire bobbin driving unit 300 is illustrated in FIG. 4. Referring to FIG. 4, each wire bobbin driving unit 300 includes a pair of roller support shafts 301 and 302 rotatably mounted to the frame 100 while being spaced apart from each other in a longitudinal direction of the frame 100. Each of the roller support shafts 301 and 302 has a hexagonal cross-sectional shape. A pair of drive rollers 311 and 312 are fitted around the roller support shaft 301 at both ends of the roller support shaft 301, respectively. The drive rollers 311 and 312 are slidable along the roller support shaft 301 in order to adjust the space defined therebetween in accordance with the size of a wire bobbin to be rotatably supported by the drive rollers 311 and 312. In similar, a pair of drive rollers 313 and 314 are fitted around the roller support shaft 302 at both ends of the roller support shaft 302, respectively. The drive rollers 313 and 314 are slidable along the roller support shaft 302 in order to adjust the space defined therebetween in accordance with the size of a wire bobbin to be rotatably supported by the drive rollers 313 and 314. The roller support shafts 301 and 302 are connected to each other by a chain 321. The roller support shaft 301 is connected to a roller driving hydraulic motor 330 (FIG. 6) via a power transmission, so that it rotates normally or reversely in accordance with a rotation force transmitted from the roller driving hydraulic motor 330.

Figure 5:
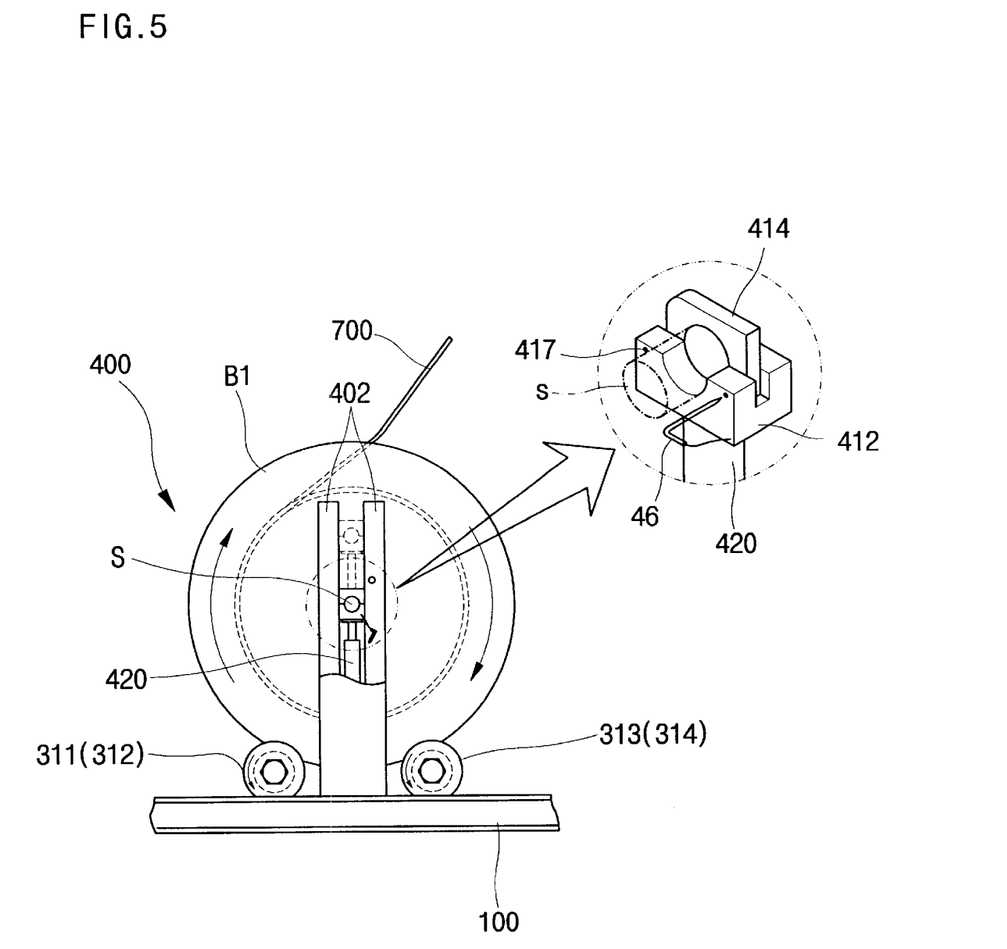
FIG. 5 is a partially-enlarged side view of a wire bobbin support unit included in the overhead power line installation apparatus.

The overhead power line installation apparatus of the present invention also includes a wire bobbin support unit 400 associated with each wire bobbin driving unit 300. The configuration of the wire bobbin support unit 400 is best shown in FIG. 5. The wire bobbin support unit 400 is adapted to maintain a wire bobbin, for example, the wire bobbin B1, in a state rotatably supported by the drive rollers 311, 312, 313, and 314 of the associated wire bobbin driving unit 300 while adjusting the level of the wire bobbin B1 in accordance with the size or diameter of the wire bobbin.

As shown in FIG. 5, the wire bobbin support unit 400 includes a pair of guide posts 402 each fixed at the lower end thereof to the frame 100 while extending upwardly from the frame 100. The guide posts 402 are arranged between the roller support shafts 301 and 302 outside the opposite ends of the wire bobbin driving unit 300 while being spaced apart from each other in a lateral direction of the frame 100. Each guide post 402 is provided with a vertically-extending guide passage. A lower support member 412 and an upper support member 414 are also provided to rotatably support each end of a central shaft S of the wire bobbin B1 in a clamped state. The support members 412 and 414 are hingably coupled to each other by a hinge pin 417 so that they hinge between a clamping state, in which they clamp the central shaft S therebetween, and a releasing state in which they release the central shaft S. In order to maintain the support members 412 and 414 in the clamping state, a pin 416 is also provided, which is adapted to be inserted into pin holes extending through the support members 412 and 414. The lower support member 412 is received in the guide passage of the guide post 402 so that it slides vertically along the guide passage. A lift cylinder 420 is fixedly mounted to the frame 100 while extending upwardly along the guide passage of the guide post 402. The lower support member 412 is fixedly mounted, at the lower end thereof, to the upper end of a piston rod included in the lift cylinder 420. As the piston rod of the lift cylinder 420 moves vertically, the support members 412 and 414 slide vertically along the guide passage of the guide post 402.

The lift cylinder 420 is coupled to a hydraulic circuit shown in FIG. 6 and described hereinafter, so that it is driven by the hydraulic circuit in a controlled fashion.

A wire twist preventing unit 500 is arranged at a portion of the frame 100 opposite to the engine assembly 200 in order to prevent wires from being twisted when they are wound around or unwound from a wire bobbin rotatably supported by each wire bobbin support unit 400.

The configuration of the wire twist preventing unit 500 is best shown in FIG. 1. Referring to FIG. 1, the wire twist preventing unit 500 includes a plurality of vertically-extending feeding screw support bars 510 fixedly mounted, at the lower ends thereof, to the end of the frame 100 opposite to the engine assembly 200 while being spaced apart from one another in the lateral direction of the frame 100. The wire twist preventing unit 500 also includes a plurality of feeding screws 521, 522, 523, and 524 each axially mounted between adjacent ones of the feeding screw support bars 510, and a plurality of feeding guide shafts 531, 532, 533, and 534 respectively associated with the feeding screws 521, 522, 523, and 524. Each of the feeding guide shafts 531, 532, 533, and 534 is axially mounted between the feeding screw support bars 510, to which an associated one of the feeding screws 521, 522, 523, and 524 is mounted, while being parallel to the associated feeding screw. The wire twist preventing unit 500 further includes a plurality of slide blocks 541, 542, 543, and 544 each coupled, at a lower end thereof, to an associated one of the feeding screws 521, 522, 523, and 524 to slide along the associated feeding screw in accordance with a rotation of the associated feeding screw. Each of the slide blocks 541, 542, 543, and 544 is slidably fitted, at an upper end thereof, around an associated one of the feeding guide shafts 531, 532, 533, and 534, so that its slide movement is guided by the associated feeding guide shaft. A wire, which is to be wound around or unwound from a wire bobbin, extends through an opening defined in each of the slide blocks 541, 542, 543, and 544. By this configuration, when a wire is wound around or unwound from a wire bobbin, an associated one of the slide blocks 541, 542, 543, and 544 guides a movement of the wire while sliding along the associated feeding screw in a state guided by the associated feeding guide shaft in accordance with a rotation of the associated feeding screw, thereby causing the wire to be uniformly wound around or unwound from the wire bobbin without any twist thereof. In order to drive the feeding screws 521, 522, 523, and 524, feeding screw driving hydraulic motors 551, 552, 553, and 554 are coupled to those feeding screws 521, 522, 523, and 524, respectively. These hydraulic motors 551, 552, 553, and 554 are driven in a controlled fashion by the hydraulic circuit of FIG. 6.

A pair of limit switches LS1 and LS2 are arranged at opposite ends of each feeding guide shafts 531, 532, 533, or 534, respectively, in order to respectively detect positions where an associated one of the slide blocks 541, 542, 543, and 544 changes its sliding direction. In the illustrated case, each limit switch LS1 or LS2 is attached to a desired one of the feeding screw support bars 510.

The above mentioned hydraulic circuit included in the overhead power line installation apparatus according to the present invention is adapted to control the rotation and lifting of one wire bobbin and the twist prevention operation for the wire bobbin. In other words, the overhead power line installation apparatus includes a plurality of hydraulic circuits respectively associated with the wire bobbin driving units 300. The configuration of one hydraulic circuit is illustrated in FIG. 6.

Figure 6:
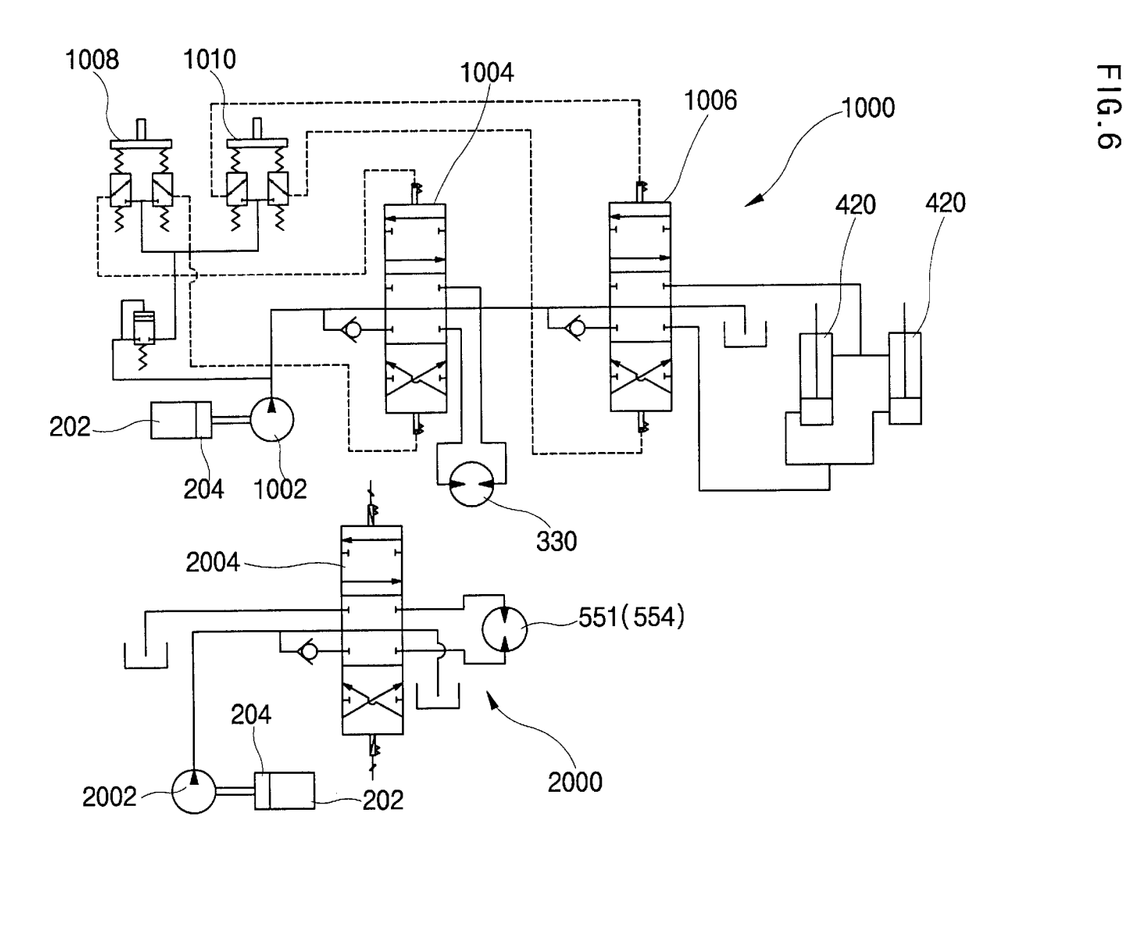
FIG. 6 is a circuit diagram illustrating a hydraulic circuit included in the overhead power line installation apparatus.

As shown in FIG. 6, the hydraulic circuit includes a first hydraulic circuit 1000 for controlling the roller driving hydraulic motor 330 and the lift cylinders 420. The first hydraulic circuit 1000 includes a large-capacity hydraulic pump which is the hydraulic pump 1002 mentioned above. The first hydraulic circuit 1000 also includes a hydraulic motor direction control valve 1004 adapted to control the roller driving hydraulic motor 330, and a cylinder direction control valve 1006 adapted to control the lift cylinders 420. The hydraulic motor direction control valve 1004 and the cylinder direction control valve 1006 communicate with a central passage of the hydraulic pump 1002. The first hydraulic circuit 1000 further includes joystick valves 1008 and 1010 for controlling the hydraulic motor direction control valve 1004 and the cylinder direction control valve 1006 using pilot pressures, respectively.

The hydraulic circuit includes a second hydraulic circuit 2000 for controlling an associated one of the feeding screw driving hydraulic motors, for example, the hydraulic motor 551. The second hydraulic circuit 2000 includes a low-capacity hydraulic pump which is the hydraulic pump 2002 mentioned above. The second hydraulic circuit 2000 also includes a direction change valve 2004 communicating with a central fluid passage of the hydraulic pump 2002. The direction change valve 2004 changes the rotation direction of the hydraulic motor 551 in accordance with electrical signals outputted from the limit switches LS1 and LS2, thereby changing the rotation direction of the associated feeding screw 521.

Now, the operation of the overhead power line installation apparatus having the above mentioned configuration according to the present invention will be described with reference to the illustrated hydraulic system.

Figure 7:
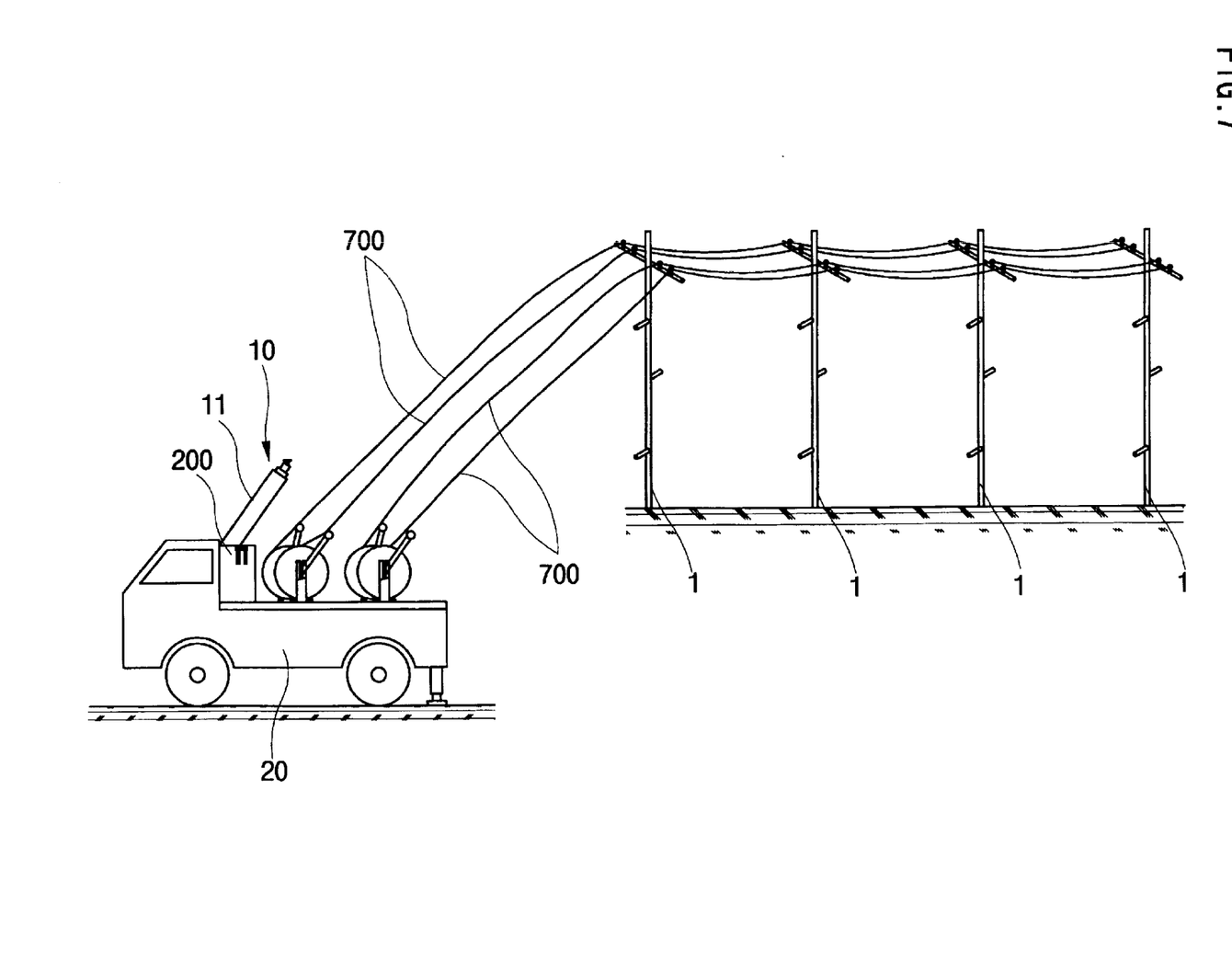
FIG. 7 is view illustrating the using condition of the overhead power line installation apparatus.

In order to conduct a line installation or replacement task using the overhead power line installation apparatus of the present invention, the frame 100 of the apparatus is first carried on a vehicle 20 carrying a crane 10, as shown in FIG. 7. Thereafter, the wire bobbins B1, B2, B3 and B4 wound with wires are put on the drive rollers of the associated wire bobbin driving units 300, respectively, using the crane 10.

The procedure for putting the wire bobbin B1 on the drive rollers of the wire bobbin driving unit 300 will now be described.

At each guide post 402 of the wire bobbin support unit 400 associated with the wire bobbin driving unit 300, the upper support member 414 is hingably moved about the hinge pin 417 with respect to the lower support member 412 so that the support members 412 and 414 are opened to allow an associated end of the central shaft S of the wire bobbin B1 to be put on the lower support member 412. At this time, the lower support member 412 is maintained at a lifted position thereof by the lift cylinder 420. The wire bobbin B1 is then put on the wire bobbin support unit 400 in such a fashion that both ends of the central shaft S of the wire bobbin B1 are placed on the lower support members 412 received in the guide posts 402 in a lifted state. Thereafter, the central shaft S is clamped at each end thereof by the lower and upper support members 412 and 414. That is, at each end of the central shaft S, the upper support member 414 is hingably moved to its original position, that is, a clamping position, in such a fashion that the pin holes of the lower and upper support members 412 and 414 are aligned with each other. In this state, the pin 416 is inserted into the aligned pin holes of the support members 412 and 414. Thus, the support members 412 and 414 maintains the central shaft S in a clamped state, as shown in FIG. 5.

In this state, the joystick valve 1010 is manipulated to downwardly move the piston rod of the lift cylinder 420 arranged at each guide post 402, thereby causing the wire bobbin B1 to come into contact with the drive rollers 311, 312, 313, and 314 at the outer peripheral surfaces of wheels included in the wire bobbin B1, as shown in FIG. 5.

In this state, the wire bobbin B1 is in linear contact with the drive rollers 311, 312, 313, and 314. Accordingly, when the roller support shafts 301 and 302 serving to rotate the drive rollers 311, 312, 313, and 314, are rotated in accordance with a rotation of the roller driving hydraulic motor 330, the wire bobbin B1 rotates in a direction corresponding to the rotation direction of the roller driving hydraulic motor 330.

The unwinding of the wire wound around each wire bobbin B1, B2, B3, or B4 can be conducted in accordance with the rotation of the associated roller driving hydraulic motor 330 or the movement of the vehicle 20. Where the rotation of the roller driving hydraulic motor 330 is used, the wire bobbin is in contact with the drive rollers 311, 312, 313, and 314 at the outer peripheral surfaces of its wheels. On the other hand, where the movement of the vehicle 20 is used, the outer peripheral wheel surfaces of the wire bobbin are spaced apart from the drive rollers 311, 312, 313, and 314. In this connection, the level of the wire bobbin is adjusted in accordance with a manipulation for the lift cylinders 420.

In accordance with a line installation or replacement task given, three or four wire bobbins are used. Since each wire bobbin used has a wheel width determined depending on the task, the space between the drive rollers, 311 and 312, or, 313 and 314, mounted to each roller support shaft 301 or 302 is correspondingly adjusted by axially sliding those drive rollers along the roller support shaft.

Under the condition in which the central shaft S of each wire bobbin B1, B2, B3, or B4 are supported by the associated lift cylinders 420, and the wire bobbin is in close contact with the drive rollers 311, 312, 313, and 314 at its wheels, the leading end of the wire wound around the wire bobbin is slightly unwound by slightly rotating the wire bobbin.

The operator then extends the unwound leading end of the wire through rollers R1 and R2 freely rotatably mounted to the upper end of a telescopic boom 11 included in the crane 10, thereby holding the leading end of the wire on the upper end of the boom 11. In this state, the operator drives the vehicle 20 in order to place the vehicle 20 at a post area where a post 1 to be initially subjected to the task is located.

Once the vehicle 20 is placed at the post area, the level of the vehicle 20 is adjusted to be horizontal, using jacks which have a conventional configuration and serve to firmly support the vehicle 20 on the ground. Although not shown, a level is attached to the rear surface of a boot provided at the vehicle 20 in order to accurately adjust the level of the vehicle 20.

In a state in which the vehicle 20 is horizontally maintained, the boom 11 is extended so that its upper end reaches a level at which the on-post worker is positioned. Simultaneously with the extension of the boom 11, each bobbin B1, B2, B3, or B4 is rotated to unwound the wire, so that it does not interfere with the extension of the boom 11.

For the rotation of each bobbin B1, B2, B3, or B4, the operator manipulates the lever of the joystick valve 1008 to drive the associated roller driving hydraulic motor 330. When the hydraulic motor 330 is driven, the associated drive rollers 311, 312, 313, and 314 are rotated, so that the wire bobbin, which is in contact with the drive rollers at the outer peripheral edge thereof, is rotated.

When the boom 11 is extended so that its upper end reaches the level at which the on-post worker is positioned, the operator stops the extension of the boom 11 while temporarily stopping the rotation of the wire bobbin.

Under this condition, the on-post worker can conduct a line installation or replacement task by taking the wires, held on the upper end of the boom 11, from the boom 11 one by one. Accordingly, the line installation or replacement task can be carried out with a superior security and a superior workability, as compared to the conventional method in which the on-post work receives wires one by one from the on-ground worker, and then lifts up the wires onto the post.

After completion of the task for one post, the operator moves the vehicle 20 to the next post. The movement of the vehicle 20 is carried out in a state in which the wires are held on the upper end of the boom 11. To this end, the wires should be continuously unwound during the movement of the vehicle 20. Accordingly, the operator manipulates the lever of the joystick valve 1010 to drive the roller driving hydraulic motor 330 while controlling the number of rotations of the roller driving hydraulic motor 330 in accordance with the moving speed of the vehicle 20, under the condition in which each wire bobbin B1, B2, B3 or B4 is in contact with the associated drive rollers 311, 312, 313, and 314.

When the vehicle 20 stops, the operator manipulates the lever of the joystick valve 1010 to position the lever at its neutral position, thereby stopping the hydraulic motor 330. As a result, the wire is unwound from the wire bobbin no longer.

During the movement of the vehicle 20, the wires are moved in an overhead fashion without coming into contact with the ground. When the upper end of the boom 11 reaches the worker on the next post as the vehicle 20 moves to the next post, the movement of the vehicle 20 and the rotations of the wire bobbins are stopped. The on-post worker then conducts a line installation or replacement task by taking the wires, held on the upper end of the boom 11, from the boom 11 one by one in the same fashion as mentioned above. After completion of the above mentioned line installation or replacement task, line installation or replacement tasks for other posts in the task area are then sequentially carried out in the same fashion as mentioned above.

Meanwhile, after completion of all line installation or replacement tasks, the wires held in a loosened state among the posts should be tightened so that they are taut.

To this end, the wires are separated from the boom 11, and then inserted through the slide blocks 541, 542, 543, and 544. In this state, the hydraulic motors 330 are rotated in order to wind the wires around the wire bobbins B1, B2, B3, and B4, respectively.

That is, the operator manipulates the lever of the joystick valve 1010, thereby changing the actuating direction of the direction control valve 1004 to reversely rotate the roller driving hydraulic motors 330. As a result, the drive rollers 311, 312, 313, and 314 operatively connected to each roller driving hydraulic motor 330 are reversely rotated, thereby reversely rotating the associated wire bobbin.

Thus, the wires are wound around the wire bobbins B1, B2, B3, and B4.

During the winding of the wires, the feeding screw driving hydraulic motors 551, 552, 553, and 554 rotate repeatedly in normal and reverse directions in accordance with ON/OFF switching operations of the limit switches LS1 and LS2. Accordingly, the slide blocks 541, 542, 543, and 544, which are coupled to the feeding screws 521, 522, 523, and 524, respectively, reciprocate laterally.

As a result, the wires are uniformly wound around the associated wire bobbins B1, B2, B3, and B4 while being gradually shifted in a width direction of the wire bobbins. Thus, the present invention makes it possible to achieve an effective winding of wires without any requirement of a number of workers or an increased consumption of labor, as compared to conventional cases.

Since the hydraulic motors 330 adapted to supply a drive force required in the winding of wires are of the reversible type, they can also be effectively used in the unwinding of wires or in other cases in which a reverse drive force is required.

When the wires are completely installed in an overhead fashion and in a tight state among posts after completion of the winding operation, the worker on each post connects the wires to the clamp of a suspension insulator fixed to a cross arm of the post. Finally, the on-post worker cuts the wires extending from the wire bobbins. Thus, the line installation or replacement task is completed.

As is apparent from the above description, the present invention provides an overhead power line installation apparatus capable of conducting a line installation in an overhead fashion involving no requirement for power lines to come into contact with the ground during the carriage of those power lines. Accordingly, it is possible to protect the claddings of the power lines. Also, an enhanced reliability is provided because winding and unwinding operations for power lines are hydraulically controlled.

Accordingly, it is possible to reduce the consumption of labor while providing an enhanced security for workers. In particular, these effects are more remarkably provided in the case of a multi-line installation.

Thus, the present invention enables a rapid line installation with a reduced number of workers, thereby reducing the line installation costs. In addition, it is possible to minimize the traffic inconvenience resulting from the line installation.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An overhead power line installation apparatus for installing electric wires respectively wound around wire bobbins in the form of power lines of a 3-phase 3-wire type or power lines of a 3-phase 4-wire type on posts, comprising:

a frame;

an engine installed on the frame;

a plurality of wire bobbin driving units arranged on the frame and adapted to rotate the wire bobbins, respectively;

a plurality of wire bobbin support units installed on the frame, each of the wire bobbin support units serving to support an associated one of the wire bobbins to allow a rotation and level adjustment of the associated wire bobbin;

a wire twist preventing unit arranged on the frame and adapted to prevent the wires from being twisted when the wires are wound around or unwound from the wire bobbins; and a hydraulic circuit receiving a drive power from the engine, thereby generating a hydraulic pressure, the hydraulic circuit serving to control the wire bobbin driving units, the wire bobbin support units, and the wire twist preventing unit using the hydraulic pressure, wherein each of the wire bobbin driving units includes a plurality of drive rollers that come into contact with at least one outer peripheral edge of a wire bobbin and rotate said wire bobbin, when said at least one outer peripheral edge of a wire bobbin is placed on said drive rollers and the drive rollers are rotated.

2. The overhead power line installation apparatus according to claim 1, wherein the hydraulic circuit comprises:
a first hydraulic circuit for controlling the roller driving hydraulic motor of an associated one of the wire bobbin driving units and the lift cylinder of an associated one of the wire bobbin support units, the first hydraulic circuit comprising
a large-capacity hydraulic pump driven by the drive power of the engine;
a hydraulic motor direction control valve adapted to control the roller driving hydraulic motor;
a cylinder direction control valve adapted to control the lift cylinder;
a pair of joystick valves adapted to control the hydraulic motor direction control valve and the cylinder direction control valve using pilot pressures, respectively; and
a second hydraulic circuit for controlling an associated one of the feeding screw driving hydraulic motors, the second hydraulic circuit comprising
a low-capacity hydraulic pump driven by the drive power of the engine, and
a direction change valve communicating with a central fluid passage of the low-capacity hydraulic pump, the direction change valve serving to control a rotation direction of the associated feeding screw driving hydraulic motor in accordance with electrical signals outputted from the limit means, thereby controlling a rotation direction of the associated feeding screw.

3. An overhead power line installation apparatus according to claim 1, wherein the hydraulic circuit comprises:
a first hydraulic circuit for controlling the roller driving hydraulic motor of an associated one of the wire bobbin driving units and the lift cylinder of an associated one of the wire bobbin support units, the first hydraulic circuit comprising
a large-capacity hydraulic pump driven by the drive power of the engine;
a hydraulic motor direction control valve adapted to control the roller driving hydraulic motor;
a cylinder direction control valve adapted to control the lift cylinder;
a pair of joystick valves adapted to control the hydraulic motor direction control valve and the cylinder direction control valve using pilot pressures, respectively; and
a second hydraulic circuit for controlling an associated one of the feeding screw driving hydraulic motors, the second hydraulic circuit comprising
a low-capacity hydraulic pump driven by the drive power of the engine, and
a direction change valve communicating with a central fluid passage of the low-capacity hydraulic pump, the direction change valve serving to control a rotation direction of the associated feeding screw driving hydraulic motor in accordance with electrical signals outputted from the limit means, thereby controlling a rotation direction of the associated feeding screw.

4. An overhead power line installation apparatus according to claim 1, wherein the wire twist preventing unit comprises:
a plurality of vertically-extending feeding screw support bars fixedly mounted, at respective lower ends thereof, to the frame,
a plurality of feeding screws each laterally mounted between adjacent ones of the feeding screw support bars,
a plurality of feeding guide shafts each laterally mounted between adjacent ones of the feeding screw support bars while being parallel to an associated one of the feeding screws,
a plurality of slide blocks each coupled to an associated one of the feeding screws to slide along an associated one of the feeding guide shafts, each of the slide blocks guiding an associated one of the wires to allow the associated wire to be uniformly wound around or unwound from an associated one of the wire bobbins,
switch means for detecting positions where each of the slide blocks changes a sliding direction thereof, and
a plurality of feeding screw driving hydraulic motors for driving the feeding screws, respectively.

5. An overhead power line installation apparatus according to claim 1, wherein each of the wire bobbin support units comprises:
a pair of guide posts fixed at respective lower ends thereof to the frame while extending upwardly from the frame,
a pair of support members arranged to be movable in a longitudinal direction of the guide posts and adapted to rotatably support an associated one of the wire bobbins, and
a lift cylinder connected to each of the support members at an upper end thereof and fixedly mounted to the frame at a lower end thereof.

6. An overhead power line installation apparatus according to claim 1, wherein each of the wire bobbin driving units comprises:
a pair of roller support shafts rotatably mounted to the frame while being spaced apart from each other,
a pair of drive rollers fitted around each of the roller support shafts at both ends of the roller support shaft, respectively, the drive rollers coming into contact with an outer periphery of an associated one of the wire bobbins in accordance with a position of the associated wire bobbin,
a roller driving hydraulic motor adapted to transmit a rotating force to at least one of the roller support shafts.

7. An overhead power line installation apparatus according to claim 6, wherein each of the roller support shafts has a polygonal cross-sectional shape.

8. An overhead power line installation apparatus for installing electric wires respectively wound around wire bobbins in the form of power lines of a 3-phase 3-wire type or power lines of a 3-phase 4-wire type on posts, comprising:
a frame;
an engine installed on the frame;

a plurality of wire bobbin driving units arranged on the frame and adapted to rotate the wire bobbins, respectively, each of the wire bobbin driving units comprising
a pair of roller support shafts rotatably mounted to the frame while being spaced apart from each other,
a pair of drive rollers fitted around each of the roller support shafts at both ends of the roller support shaft, respectively, the drive rollers coming into contact with an outer periphery of an associated one of the wire bobbins in accordance with a position of the associated wire bobbin,
a chain for interconnecting the roller support shafts to each other, and
a roller driving hydraulic motor adapted to transmit a rotating force to a selected one of the roller support shafts;
a plurality of wire bobbin support units installed on the frame, each of the wire bobbin support units serving to allow an associated one of the wire bobbins to be laid on the drive rollers of an associated one of the wire bobbin driving units while adjusting a level of the associated wire bobbin in accordance with a diameter of the associated wire bobbin, each of the wire bobbin support units comprising
a pair of guide posts fixed at respective lower ends thereof to the frame while extending upwardly from the frame,
a pair of support members arranged to be movable in a longitudinal direction of the guide posts and adapted to rotatably support an associated one of the wire bobbins, and
a lift cylinder connected to each of the support members at an upper end thereof and fixedly mounted to the frame at a lower end thereof;
a wire twist preventing unit arranged on the frame and adapted to prevent the wires from being twisted when the wires are wound around or unwound from the wire bobbins, the wire twist preventing unit comprising
a plurality of vertically-extending feeding screw support bars fixedly mounted, at respective lower ends thereof, to the frame,
a plurality of feeding screws each laterally mounted between adjacent ones of the feeding screw support bars,
a plurality of feeding guide shafts each laterally mounted between adjacent ones of the feeding screw support bars while being parallel to an associated one of the feeding screws,
a plurality of slide blocks each coupled to an associated one of the feeding screws to slide along an associated one of the feeding guide shafts, each of the slide blocks guiding an associated one of the wires to allow the associated wire to be uniformly wound around or unwound from an associated one of the wire bobbins,
switch means for detecting positions where each of the slide blocks changes a sliding direction thereof, and
a plurality of feeding screw driving hydraulic motors for driving the feeding screws, respectively; and
a hydraulic circuit receiving a drive power from the engine, thereby generating a hydraulic pressure, the hydraulic circuit serving to control the wire bobbin driving units, the wire bobbin support units, and the wire twist preventing unit using the hydraulic pressure.

9. The overhead power line installation apparatus according to claim 8, wherein the hydraulic circuit comprises:

a first hydraulic circuit for controlling the roller driving hydraulic motor of an associated one of the wire bobbin driving units and the lift cylinder of an associated one of the wire bobbin support units, the first hydraulic circuit comprising
a large-capacity hydraulic pump driven by the drive power of the engine;
a hydraulic motor direction control valve adapted to control the roller driving hydraulic motor;
a cylinder direction control valve adapted to control the lift cylinder;
a pair of joystick valves adapted to control the hydraulic motor direction control valve and the cylinder direction control valve using pilot pressures, respectively; and
a second hydraulic circuit for controlling an associated one of the feeding screw driving hydraulic motors, the second hydraulic circuit comprising
a low-capacity hydraulic pump driven by the drive power of the engine, and
a direction change valve communicating with a central fluid passage of the low-capacity hydraulic pump, the direction change valve serving to control a rotation direction of the associated feeding screw driving hydraulic motor in accordance with electrical signals outputted from the limit means, thereby controlling a rotation direction of the associated feeding screw.

10. The overhead power line installation apparatus according to claim 8, wherein each of the roller support shafts has a polygonal cross-sectional shape.

11. An overhead power line installation apparatus for installing electric wires respectively wound around wire bobbins in the form of power lines of a 3-phase 3-wire type or power lines of a 3-phase 4-wire type on posts, comprising:
a frame;
an engine installed on the frame;
a plurality of wire bobbin driving units arranged on the frame and adapted to rotate the wire bobbins, respectively, each of the wire bobbin driving units comprising:
a pair of roller support shafts rotatably mounted to the frame while being spaced apart from each other,
a pair of drive rollers fitted around each of the roller support shafts at both ends of the roller support shaft, respectively, the drive rollers coming into contact with an outer periphery of an associated one of the wire bobbins in accordance with a position of the associated wire bobbin,
a roller driving hydraulic motor adapted to transmit a rotating force to at least one of the roller support shafts;
a plurality of wire bobbin support units installed on the frame, each of the wire bobbin support units serving to allow an associated one of the wire bobbins to be laid on the drive rollers of an associated one of the wire bobbin driving units while adjusting a level of the associated wire bobbin in accordance with a diameter of the associated wire bobbin, each of the wire bobbin support units comprising:
a pair of guide posts fixed at respective lower ends thereof to the frame while extending upwardly from the frame,
a pair of support members arranged to be movable in a longitudinal direction of the guide posts and adapted to rotatably support an associated one of the wire bobbins, and a lift cylinder connected to each of the support members at an upper end thereof and fixedly mounted to the frame at a lower end thereof;

a wire twist preventing unit arranged on the frame and adapted to prevent the wires from being twisted when the wires are wound around or unwound from the wire bobbins; and a hydraulic circuit receiving a drive power from the engine, thereby generating a hydraulic pressure, the hydraulic circuit serving to control the wire bobbin driving units, the wire bobbin support units, and the wire twist preventing unit using the hydraulic pressure.

12. An overhead power line installation apparatus according to claim 11, wherein the hydraulic circuit comprises:

a first hydraulic circuit for controlling the roller driving hydraulic motor of an associated one of the wire bobbin driving units and the lift cylinder of an associated one of the wire bobbin support units, the first hydraulic circuit comprising a large-capacity hydraulic pump driven by the drive power of the engine;

a hydraulic motor direction control valve adapted to control the roller driving hydraulic motor;

a cylinder direction control valve adapted to control the lift cylinder;

a pair of joystick valves adapted to control the hydraulic motor direction control valve and the cylinder direction control valve using pilot pressures, respectively; and a second hydraulic circuit for controlling an associated one of the feeding screw driving hydraulic motors, the second hydraulic circuit comprising a low-capacity hydraulic pump driven by the drive power of the engine, and a direction change valve communicating with a central fluid passage of the low-capacity hydraulic pump, the direction change valve serving to control a rotation direction of the associated feeding screw driving hydraulic motor in accordance with electrical signals outputted from the limit means, thereby controlling a rotation direction of the associated feeding screw.

13. An overhead power line installation apparatus according to claim 11, wherein the wire twist preventing unit comprises:

a plurality of vertically-extending feeding screw support bars fixedly mounted, at respective lower ends thereof, to the frame, a plurality of feeding screws each laterally mounted between adjacent ones of the feeding screw support bars, a plurality of feeding guide shafts each laterally mounted between adjacent ones of the feeding screw support bars while being parallel to an associated one of the feeding screws, a plurality of slide blocks each coupled to an associated one of the feeding screws to slide along an associated one of the feeding guide shafts, each of the slide blocks guiding an associated one of the wires to allow the associated wire to be uniformly wound around or unwound from an associated one of the wire bobbins, switch means for detecting positions where each of the slide blocks changes a sliding direction thereof, and a plurality of feeding screw driving hydraulic motors for driving the feeding screws, respectively.

14. An overhead power line installation apparatus according to claim 11, wherein each of the roller support shafts has a polygonal cross-sectional shape.

* * * * *